United States Patent
Lee et al.

(10) Patent No.: US 9,293,743 B2
(45) Date of Patent: Mar. 22, 2016

(54) BATTERY PACK

(75) Inventors: Sangjoo Lee, Yongin-si (KR); Heuisang Yoon, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 801 days.

(21) Appl. No.: 13/342,923

(22) Filed: Jan. 3, 2012

(65) Prior Publication Data

US 2012/0171520 A1 Jul. 5, 2012

(30) Foreign Application Priority Data

Jan. 4, 2011 (KR) ........................ 10-2011-0000418

(51) Int. Cl.
*H01M 2/04* (2006.01)
*H01M 2/06* (2006.01)
*H01M 2/02* (2006.01)
*H01M 2/34* (2006.01)
*H01M 10/637* (2014.01)
*H01M 10/052* (2010.01)

(52) U.S. Cl.
CPC .............. *H01M 2/0217* (2013.01); *H01M 2/34* (2013.01); *H01M 2/348* (2013.01); *H01M 10/637* (2015.04); *H01M 10/052* (2013.01)

(58) Field of Classification Search
CPC ..... H01M 2/0217; H01M 2/34; H01M 2/348; H01M 10/052; H01M 10/637
See application file for complete search history.

(56) References Cited

U.S. PATENT DOCUMENTS

| | | |
|---|---|---|
| 2009/0263711 A1 | 10/2009 | Kim et al. |
| 2009/0305117 A1 | 12/2009 | Koh et al. |
| 2010/0053835 A1 | 3/2010 | Kwag et al. |
| 2010/0075205 A1 | 3/2010 | Kwag et al. |
| 2010/0136408 A1* | 6/2010 | Koh et al. ..................... 429/122 |
| 2010/0151280 A1 | 6/2010 | Koh et al. |
| 2010/0323225 A1 | 12/2010 | Lee |
| 2011/0003181 A1 | 1/2011 | Lee et al. |
| 2011/0003195 A1 | 1/2011 | Kim |
| 2011/0003196 A1 | 1/2011 | Kim |
| 2011/0008650 A1 | 1/2011 | Kim |

FOREIGN PATENT DOCUMENTS

| | | |
|---|---|---|
| KR | 10-2009-0056027 | 6/2009 |
| KR | 10-2009-0110711 | 10/2009 |
| KR | 10-2009-0126869 | 12/2009 |
| KR | 1020100028010 | 3/2010 |
| KR | 1020100060677 | 6/2010 |
| KR | 10-2010-0136108 | 12/2010 |

OTHER PUBLICATIONS

Korean Office Action issued Jun. 8, 2012 in connection with Korean Patent Application Serial No. 10-2011-0000418 and Request for Entry of the Accompanying Office Action attached herewith.

* cited by examiner

*Primary Examiner* — Helen O Conley
(74) *Attorney, Agent, or Firm* — Robert E. Bushnell, Esq.

(57) ABSTRACT

Provided is a battery pack. The battery pack may prevent a center of a protective circuit module from being bent by external impacts during or after a process of manufacturing a battery pack. The battery pack includes a bare cell from which an electrode terminal protrudes, a circuit module disposed above the electrode terminal, a positive temperature coefficient (PTC) unit disposed between the bare cell and the circuit module, the PTC unit being electrically connected to the bare cell and the circuit module, and an electrode lead plate having one side contacting the electrode terminal and the other side contacting the PTC unit, the electrode lead plate having a top surface contacting a bottom surface of the circuit module.

14 Claims, 5 Drawing Sheets

BATTERY PACK

CLAIM OF PRIORITY

This application makes reference to, incorporates the same herein, and claims all benefits accruing under 35 U.S.C. §119 from an application earlier filed in the Korean Intellectual Property Office on 4 Jan. 2011 and there duly assigned Serial No. 10-2011-0000418.

BACKGROUND OF THE INVENTION

1. Field of the Invention

Embodiments of the present invention relate to a battery pack, and more particularly, to a battery pack in which a circuit module is prevented from drooping when the circuit module is applied by external impacts.

2. Description of the Related Art

A lithium secondary battery may have a form of a battery pack. The battery pack includes an electrode assembly including a positive electrode plate, a negative electrode plate, and a separator imposed between the positive and negative electrode plates. A can receives the electrode assembly. A bare cell includes a cap assembly which seals an opening disposed at an upper end of the can. A protective circuit module includes a charge/discharge device, and a positive temperature coefficient (PTC) unit is respectively electrically connected to the bare cell and the protective circuit module in order to prevent a current from flowing when an internal temperature of the bare cell is increased.

SUMMARY OF THE INVENTION

In a contemporary battery pack, a center of the protective circuit module may be disadvantageously bent downward by external impacts during or after a process of manufacturing the battery pack.

One aspect of the present invention provides a battery pack which may prevent a center of the protective circuit module from being bent by external impacts during or after a process of manufacturing a battery pack.

According to one embodiment of the present invention, a battery pack includes a bare cell from which an electrode terminal protrudes; a circuit module disposed above the electrode terminal; a positive temperature coefficient (PTC) unit disposed between the bare cell and the circuit module, the PTC unit being electrically connected to the bare cell and the circuit module; and an electrode lead plate having one side contacting the electrode terminal and the other side contacting the PTC unit, the electrode lead plate having a top surface contacting a bottom surface of the circuit module.

The battery pack may further include first and second lead plates disposed on both sides between the bare cell and the circuit module. The first and second lead plates contact a top surface of the bare cell and the bottom surface of the circuit module.

The sum of a protruding height of the electrode terminal and a thickness of the electrode lead terminal may be equal to a height of each of the first and second lead plates.

The circuit module may have a through hole in a position corresponding to the electrode terminal.

At least one of a width and length of the through hole may be less than those of the electrode terminal.

At least portion of the electrode lead plate may be disposed under the through hole, and the electrode lead plate is welded to the electrode terminal through the through hole.

An electrical conductive pattern may be not provided at a portion of the protective circuit module contacting the electrode lead plate.

An electrical insulation layer may be disposed on a portion of the protective circuit module contacting the electrode lead plate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Korean Patent Application No. 10-2011-0000418 filed on Jan. 4, 2011, in the Korean Intellectual Property Office, and entitled: "BATTERY PACK" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, a battery pack constructed with an embodiment will be described in detail with reference to the accompanying drawings.

Figure 1:
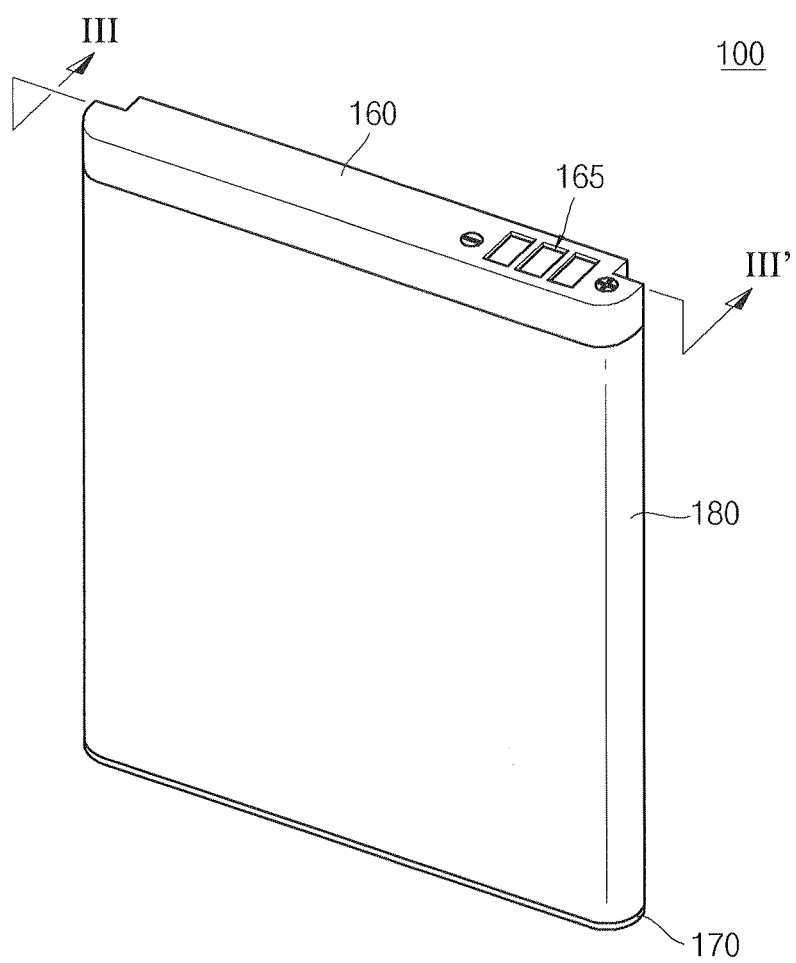
FIG. 1 is an assembled oblique view of a battery pack constructed with an embodiment.
Figure 2:
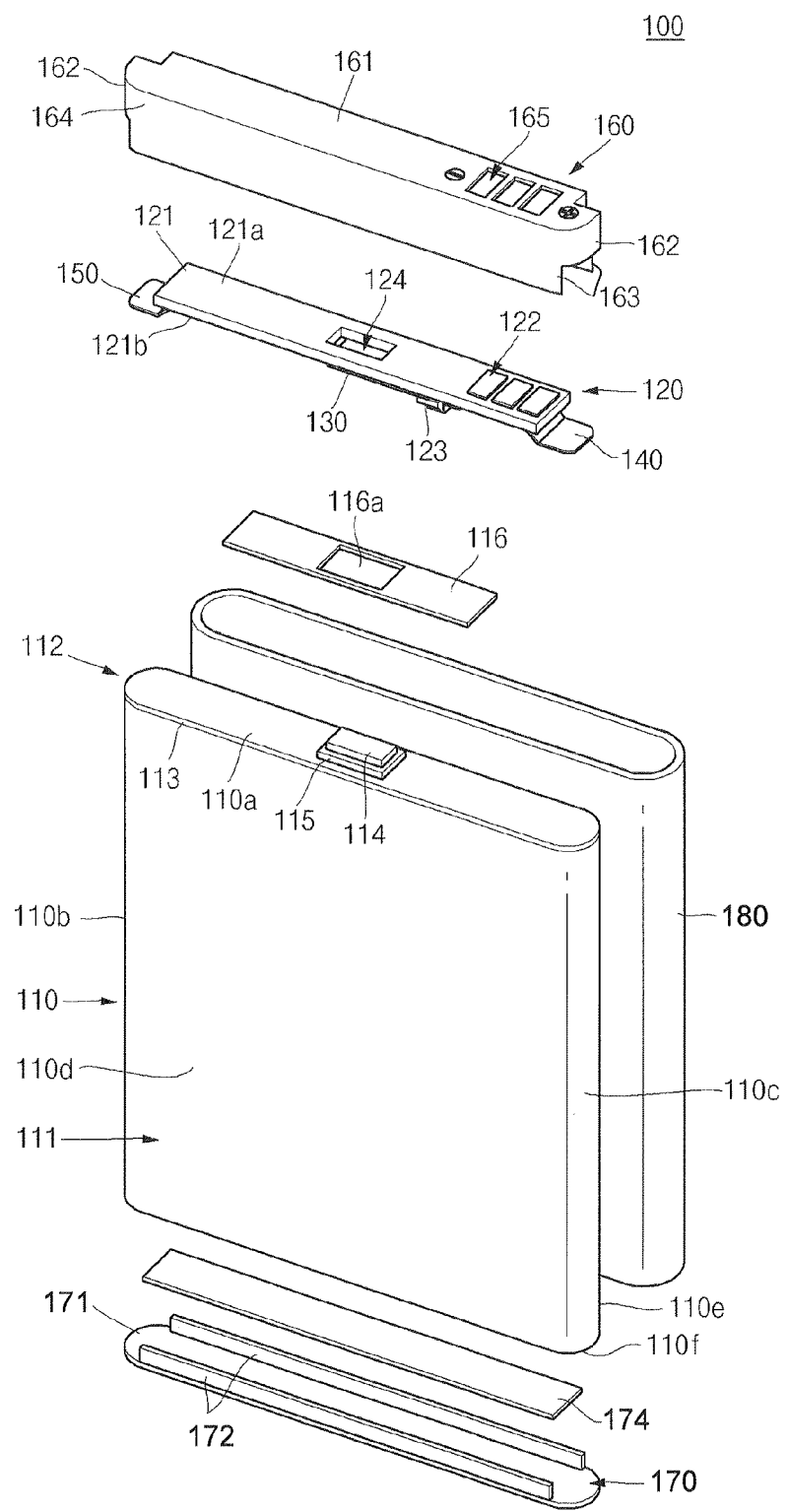
FIG. 2 is an exploded oblique view of the battery pack of FIG. 1.
Figure 3:
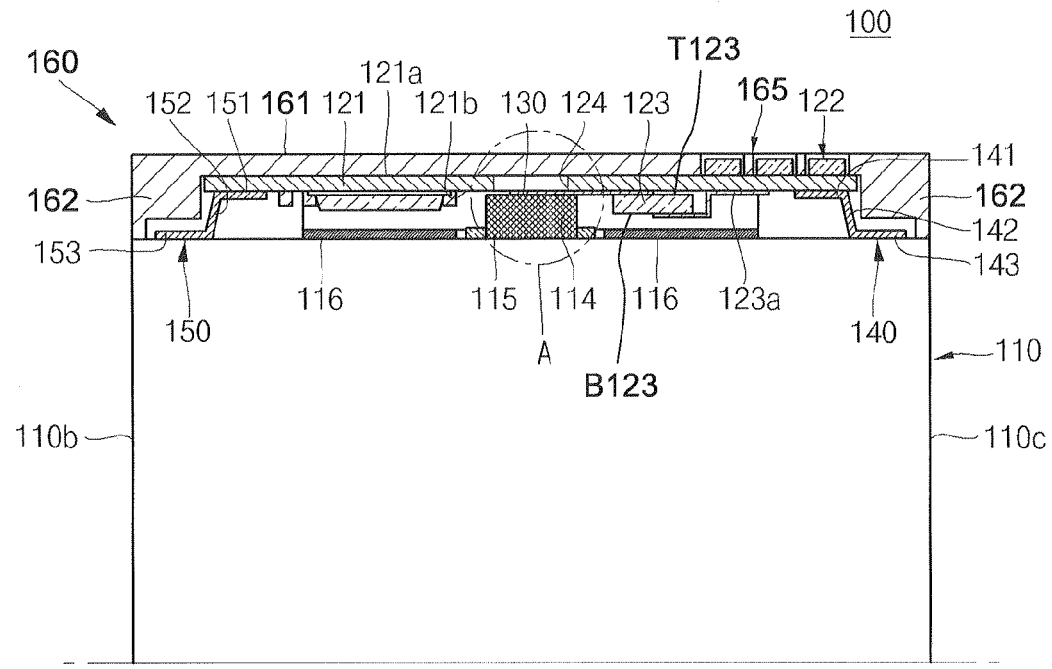
FIG. 3 is a sectional cross-sectional view of the battery pack taken along line III-III' of FIG. 1.
Figure 4:
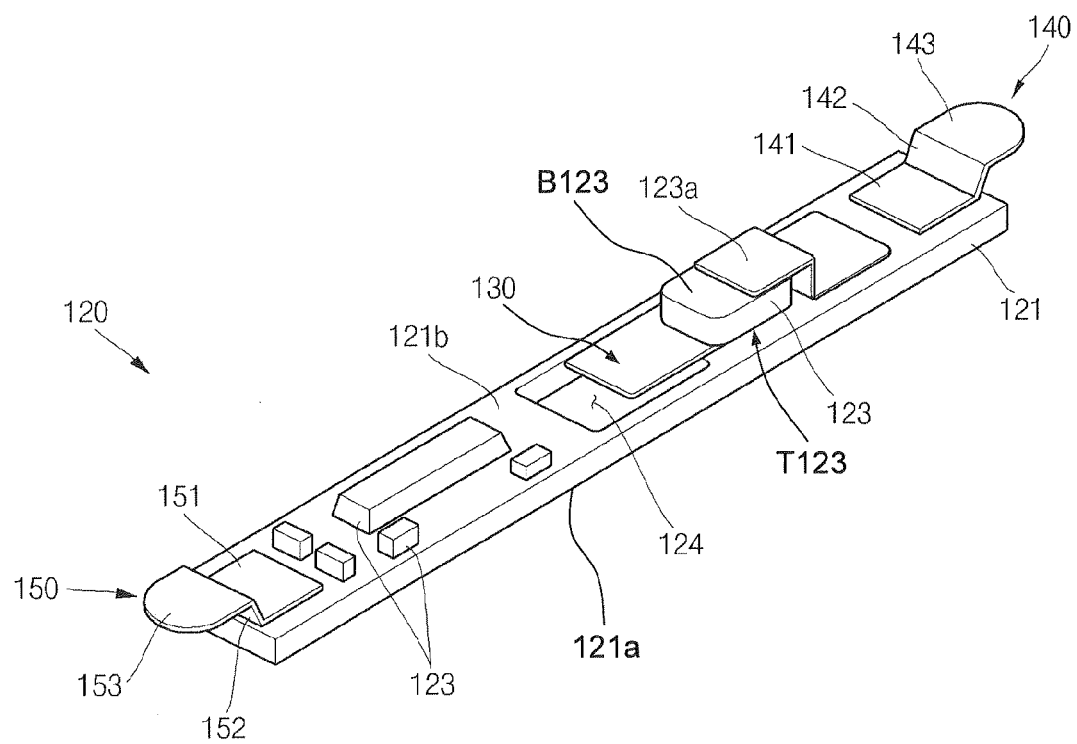
FIG. 4 is an oblique view illustrating a lower portion of a circuit module of the battery pack of FIG. 1.
Figure 5:
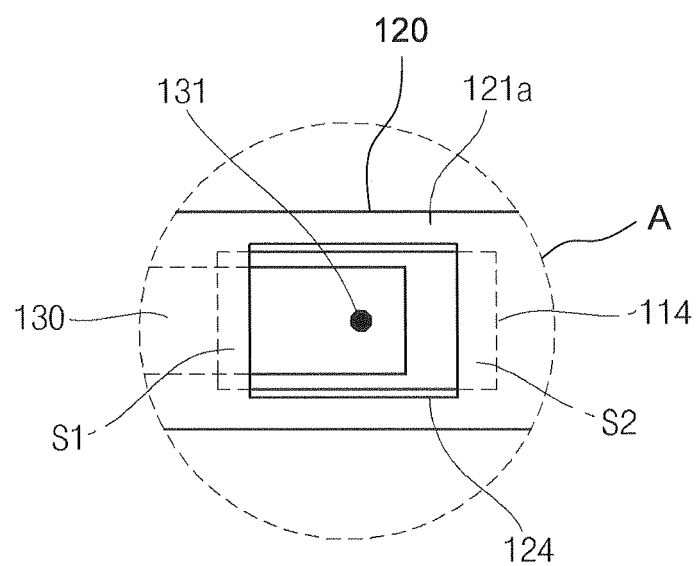
FIG. 5 is an enlarged plan view of a region A of FIG. 3.

FIG. 1 is an assembled oblique view of a battery pack constructed with an embodiment, and FIG. 2 is an exploded oblique view of the battery pack of FIG. 1. FIG. 3 is a sectional cross-sectional view of the battery pack taken along line III-III' of FIG. 1, and FIG. 4 is an oblique view illustrating a lower portion of a circuit module of the battery pack of FIG. 1. FIG. 5 is an enlarged plan view of a region A of FIG. 3.

Referring to FIGS. 1 through 3, a battery pack 100 constructed with an embodiment may include a bare cell 110, a circuit module 120, an electrode lead plate 130, a first lead plate 140, a second lead plate 150, a top, cover 160, a bottom cover 170, and a label 180.

A core pack may be formed by the bare cell 110 and the circuit module 120 which are electrically connected to each other through the electrode lead plate 130, the first lead plate 140, and the second lead plate 150. The core pack may be coupled to the top cover 160 and the bottom cover 170 and labeled by the label 180 to complete the battery pack 100.

The bare cell 110 has an electrode assembly (not shown) including a positive electrode, a negative electrode, and a separator disposed between the positive electrode and the negative electrode, a container type can 111 receiving the electrode assembly and an electrolyte (not shown), and a cap assembly 112 sealing an opening of the can 111. Here, the cap assembly 112 may include a cap plate 113 formed of a metal material, an electrode terminal 114 coupled to the cap plate 113 to protrude from the cap plate 113, and a gasket 115 disposed between the cap plate 113 and the electrode terminal 114 to electrically insulate the electrode terminal 114 from the cap plate 113.

Also, the electrode terminal 114 protrudes by the same height as those of the first and second lead plates 140 and 150 that will be described below.

As shown in FIG. 2, the bare cell 110 may have a top surface 110a from which the electrode terminal 114 protrudes, a pair of short side surfaces 110b and 110c and long side surfaces 110d and 110e connected to the top surface 110a, and a bottom surface 110f connected to the side surfaces 110b, 110c, 110d, and 110e and facing the top surface 110a. Here, the pair of short side surfaces 110b and 110c denotes side surfaces each having a narrower width among the side surfaces 110b, 110c, 110d, and 110e, and the pair of long side surfaces 110d and 110e denotes side surfaces each having a wider width among the side surfaces 110b, 110c, 110d, and 110e.

An insulation film 116 in which a through hole 116a is defined to allow the electrode terminal 114 and the gasket 115 to protrude therethrough may be further disposed on a center of the top surface 110a of the bare cell 110 to surely electrically insulate the top surface 110a from the circuit module 120.

The circuit module 120 may be disposed above the bare cell 110 (i.e., above the electrode terminal 114) and be electrically connected to the bare cell 110. The circuit module 120 may include a circuit board 121, an external terminal 122, a positive temperature coefficient (PTC) unit 123, and a through hole 124.

The circuit board 121 includes a plate formed of a resin. Also, the circuit board 121 includes a protection circuit (not shown) such as a circuit (not shown) for controlling charging and discharging of the bare cell 110 or a circuit for preventing overcharging and overdischarging. In the current embodiment, a top surface 121a of the circuit board 121 is equal to the top surface of the circuit module 120, and a bottom surface 121b of the circuit board 121 is equal to the bottom surface of the circuit module 120.

The external terminal 122 is disposed on the top surface 121a of the circuit board 121 to electrically connect the circuit board 121 to external electronic equipments (not shown).

The PTC unit 123 is disposed between the bare cell 110 and the circuit module 120. When an internal temperature of the bare cell 110 is increased, a resistance of the PTC unit 123 may significantly increase to prevent a current from flowing. Furthermore, the PTC unit 123 may be disposed on the bottom surface 121b of the circuit board 121. Thus, as shown in FIG. 3, a top surface T123 of the PTC unit 123 is electrically connected to the electrode lead plate 130 that will be described below, and a bottom surface B123 of the PTC unit 123 is electrically connected to a PTC lead 123a electrically connected to the circuit module 120.

The through hole 124 passes through the top and bottom surfaces 121a and 121b of the circuit board 121. The through hole 124 is defined at a position corresponding to that of the electrode terminal 114. Also, at least one of a width and length of the through hole 124 is less than those of the electrode terminal 114. Thus, the electrode terminal 114 does not pass through the through hole 124.

The electrode lead plate 130 is disposed between the circuit board 121 and the electrode terminal 114 to provide a passage through which a current is supplied from the electrode terminal 114. The electrode lead plate 130 may be formed of a metal material, e.g., nickel or a nickel alloy.

Referring to FIGS. 4 and 5, the electrode lead plate 130 may have a plate shape. Also, as shown in FIG. 3, a bottom surface of the electrode lead plate 130 has one side (a left side) contacting the electrode terminal 114 and the other side (a right side) contacting the PTC unit 123. Also, the top surface of the electrode lead plate 130 contacts a bottom surface of the circuit module 120. A portion of the electrode lead plate 130 is disposed under the through hole 124. That is, the top surface of a side of the electrode lead plate 130 is exposed by the through hole 124, and thus does not contact the bottom surface of the circuit module 120. Also, the electrode lead plate 130 is welded to at least one point of the electrode terminal 114 through the through hole 124 to define at least one welding portion 131.

As shown in FIG. 5, the electrode terminal 114 may have a length greater than that of the through hole 124 and a width less than that of the through hole 124.

In the embodiment as shown in FIG. 5, the electrode lead plate 130 is disposed on one side (a left side) with respect to the through hole 124 to expose a portion of the electrode lead plate 130 to the outside through the through hole 124. Thus, a region S1 in which the electrode terminal 114, the circuit module 120, and the electrode lead plate 130 overlap each other is defined at one side (the left side) of the through hole 124. Therefore, the electrode terminal 114 and the electrode lead plate 130 may support a center of the circuit module 120 to prevent the circuit module 120 from drooping down.

In another embodiment, the electrode lead plate 130 may extend up to the other side (a right side) of the through hole 124. Thus, the other region S2 in which the electrode terminal 114, the circuit module 120, and the electrode lead plate 130 overlap each other is defined at the other side (the right side) of the through hole 124. Therefore, the electrode terminal 114 and the electrode lead plate 130 may support the center of the circuit module 120 in the two regions S1 and S2 to prevent the circuit module 120 from drooping down.

Figure 6:
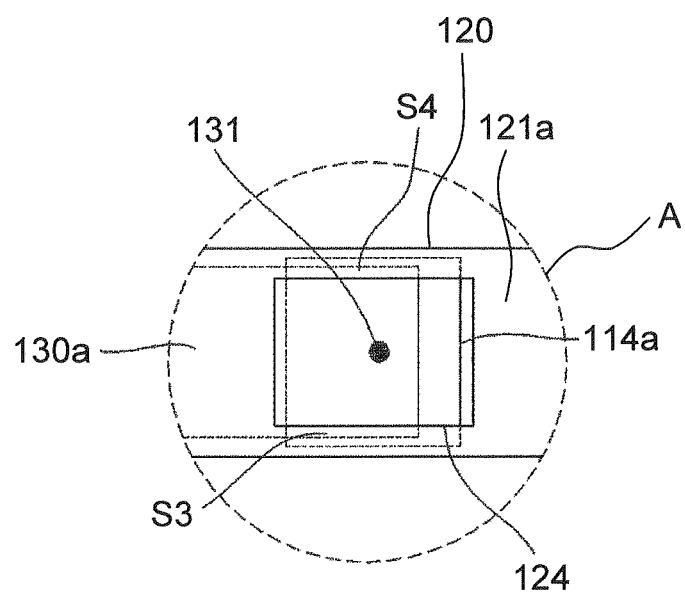
FIG. 6 is an enlarged plan view of a region A of FIG. 3 constructed with another embodiment.

Furthermore, as shown in FIG. 6, the electrode lead plate 130a in case where the electrode terminal 114a has a width greater than that of the through hole 124 and a length less than that of the through hole 124 will be described below in detail.

The electrode lead plate 130a is disposed on one side (the left side) with respect to the through hole 124 to expose a portion of the electrode lead plate 130a to the outside through the through hole 124. Here, the electrode lead plate 130a has a width greater than that of at least through hole 124.

Thus, a region in which the electrode terminal 114a, the circuit module 120, and the electrode lead plate 130a overlap each other is defined in a circumference (S3, S4) of the long side of the through hole 124. Therefore, the electrode terminal 114a and the electrode lead plate 130a may support the center of the circuit module 120 to prevent the circuit module from drooping down.

Through the above description, when the through hole 124 has a width and length less than those of the electrode terminal 114, since it may be understood that the electrode terminal 114 and the electrode lead plate 130 support the center of the circuit module 120, its detailed description will be omitted. In another embodiment, when the area of the through hole 124 is smaller than the area of the upper surface of the electrode terminal 114, the electrode terminal 114 and the electrode lead plate 130 support the center of the circuit module 120 and prevent the circuit module 120 from drooping.

Also, an electrical insulation film (not shown) may be disposed on a portion at which the electrode lead plate 130 contacts the circuit module 120; or alternatively, no electrical conductive wiring pattern is disposed on the circuit module 120 since the electrode lead plate 130 is electrically insulated from the circuit module 120. This is done for a reason that an electrical flow discharged from the bare cell 110 to flow into the circuit module 120 necessarily passes through the PTC unit 123 to allow the PTC unit 123 to control the electrical flow of the battery pack 100.

The first lead plate 140 is coupled to one side of the circuit module 120 and electrically connected to a positive wiring pattern (not shown) of the circuit module 120. Also, the first lead plate 140 extends and is connected to the top surface 110a of the bare cell 110 to electrically connect the bare cell 110 to the circuit module 120. That is, the first lead plate 140 is electrically connected to the top surface 110a (i.e., constituting the cap plate 113 to serve as a positive electrode) of the bare cell 110 to serve as a positive electrode. The first lead plate 140 may be formed of a metal material, e.g., nickel or a nickel alloy.

Specifically, referring to FIG. 4, the first lead plate 140 includes a first lead bottom part 141, a first lead sidewall part 142, and a first lead extension part. 143. As shown in FIG. 3, the first lead plate 140 may have same height as the sum of a height of the electrode terminal 114 protruding upward from the bare cell 110 and a thickness of the electrode lead plate 130.

The first lead bottom part 141 contacts a side of the bottom surface 121b of the circuit board 121 having a plate shape and is electrically connected to the circuit module 120 using laser welding.

The first lead sidewall part 142 is bent from the bottom part 141 to extend toward the top surface 110a of the bare cell 110, thereby securing a distance between the circuit module 120 and the bare cell 110.

The first lead extension part 143 is bent from the first lead sidewall part 142 to extend so that it contacts the top surface 110a of the bare cell 110. Also. The first lead extension part 143 is disposed parallel to the first lead bottom part 141. The first lead extension part 143 is electrically connected to the top surface 110a of the bare cell 110 through the laser welding.

The second lead plate 150 is coupled to the other side of the circuit module 120 in a manner symmetrical with respect to the first lead plate 140 and electrically connected to the positive wiring pattern (not shown) of the circuit module 120. Also, the second lead plate 150 extends and is connected to the top surface 110a of the bare cell 110 to electrically connect the bare cell 110 to the circuit module 120. The second lead plate 150 may be disposed opposite to and faces the first plead plate 140 as shown in FIG. 4.

The second lead plate 150 may have the same shape, size, and be made of material as that of the first lead plate 140. The second lead plate 150 may include a second lead bottom part 151, a second lead sidewall part 152, and a second lead extension part 153. Referring to FIG. 2, since the second lead bottom part 151, the second lead sidewall part 152, and the second extension part 153 of the second lead plate 150 correspond to the first lead bottom part 141, the first lead sidewall part 142, and the first lead extension part 143 of the first lead plate 140, detailed description of the second lead plate 150 will be omitted.

One of the first lead plate 140 and the second lead plate 150 may be a dummy.

Thus, since the center and both sides of the circuit module 120 may not droop down with the support of the electrode terminal 114, the electrode lead plate 130, the first lead plate 140, and the second lead plate 150, the circuit module 120 disposed on the bare cell 110 may be maintained flat and be parallel to the bare cell 110.

As shown in FIGS. 2 and 3, the top cover 160 is coupled to an upper portion of the bare cell 110 to receive the circuit module 120 therein. The top cover 160 may include a cover plate 161 and a sidewall 164 extending from the cover plate 161 toward the circuit module 120.

The cover plate 161 may have a shape approximately similar to that of the top surface 110a of the bare cell 110. An inner surface of the cover plate 161 facingly contacts the top surface 121b of the circuit board 121. The cover plate 161 has a through hole 165 in a region corresponding to the external terminal 122. The through hole 165 exposes the external terminal 122 to the outside in order to electrically connect the battery pack 110 to the external electronic equipment (not shown).

The sidewall 164 includes both ends 162 disposed on both ends of a length direction of the top cover 160 and a connection part 163 connecting both ends 162 to each other. Both ends 162 correspondingly contacts the short side surfaces 110b and 110c of the bare cell 110 to support the top cover 160. The connection part 163 extends toward the circuit module 120 further than both ends 162. Portions of the connection part 163 covering upper portions of the pair of long side surfaces 110d and 110e of the bare cell 110 are surrounded by the label 180 that will be described below.

As shown in FIGS. 1 and 2, the bottom cover 170 is coupled to a lower portion of the bare cell 110. The bottom cover 170 may include a bottom plate 171 and an extension part 172 extending from the bottom plate 171 toward the bare cell 110.

The bottom plate 171 may have a shape approximately equal to that of the bottom surface 110f of the bare cell 110. The bottom plate 171 is attached to the bottom surface 110f of the bare cell 110 by an adhesion member 174.

The extension part 172 covers lower portions of the long side surfaces 110d and 110e of the bare cell 110. The extension part 172 is surrounded by the label 180.

As shown in FIG. 2, the label 180 is attached to surround the side surfaces 110b, 110c, 110d, and 110e of the bare cell 110. The label 180 covers a portion of the connection part 163 of the top cover 160 and the extension part 172 of the bottom cover 170.

As described above, the electrode terminal 114 to which the electrode lead plate 130 is welded may support the center of the circuit module 120. In addition, the first lead plate 140 and the second lead plate 150 may be disposed on both sides of the circuit module 120 to support both sides of the circuit module 120.

Thus, such configuration may prevent the center of the circuit module 120 from drooping down due to a welding device (not shown) in the welding process of the electrode terminal 114 and the electrode lead plate 130, with the welding process being one necessary procedural step of manufacturing the battery pack 100. Also, such configuration may prevent the center of the circuit module 120 from being bent by impacts applied form the outside after the manufacturing process.

In the battery pack constructed with the embodiment, it may prevent the center of the protective circuit module from drooping down by the external impacts during or after the manufacturing process of the battery pack.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
a bare cell from which an electrode terminal protrudes;
a circuit module disposed above the electrode terminal;
a positive temperature coefficient (PTC) unit disposed between the bare cell and the circuit module, the PTC unit being electrically connected to the bare cell and the circuit module; and
an electrode lead plate having one side contacting the electrode terminal and another side contacting the PTC unit, the electrode lead plate having a top surface contacting a bottom surface of the circuit module,
wherein, when the battery pack is viewed in a direction along which the electrode terminal protrudes from the bare cell, all of the electrode terminal and the circuit module and the electrode lead plate overlap each other in at least one point, and in the at least one point, the electrode lead plate is in immediate contact with the circuit module and the electrode terminal, and
wherein an electrical conductive pattern is not provided on the circuit module at a portion where the circuit module contacts the electrode lead plate.

2. The battery pack as claimed in claim 1, further comprising first and second lead plates disposed on both sides between the bare cell and the circuit module, and the first and second lead plates contacting a top surface of the bare cell and the bottom surface of the circuit module.

3. The battery pack as claimed in claim 2, wherein the sum of a protruding height of the electrode terminal and a thickness of the electrode lead plate is equal to a height of each of the first and second lead plates.

4. The battery pack as claimed in claim 1, wherein the circuit module has a through hole in a position corresponding to the electrode terminal.

5. The battery pack as claimed in claim 4, wherein at least one of a width and length of the through hole is less than those of the electrode terminal.

6. The battery pack as claimed in claim 4, wherein at least a portion of the electrode lead plate is disposed under the through hole, and the electrode lead plate is welded to the electrode terminal through the through hole.

7. A battery pack, comprising:
a bare cell having a surface from which an electrode terminal protrudes;
a circuit module disposed on the electrode terminal;
a positive temperature coefficient (PTC) unit disposed between the bare cell and the circuit module, the PTC unit being electrically connected to the bare cell and the circuit module;
an electrode lead plate having one side contacting the electrode terminal and another side contacting the PTC unit, the electrode lead plate having a top surface contacting a bottom surface of the circuit module; and
at least one second lead plate being disposed between the bare cell and the circuit module and at a distal end of the circuit module, the second lead plate projecting from the surface of the bare cell, and a distance between an upper surface of the electrode lead plate and the surface of the bare cell being equal to a distance between an upper surface of the second lead plate and the surface of the bare cell,
wherein, when the battery pack is viewed in a direction along which the electrode terminal protrudes from the bare cell, all of the electrode terminal and the circuit module and the electrode lead plate overlap each other in at least one point, and in the at least one point, the electrode lead plate is in immediate contact with the circuit module and the electrode terminal, and
wherein an electrical conductive pattern is not provided at a portion on the circuit module where the circuit module contacts the electrode lead plate.

8. The battery pack of claim 7, wherein a bottom surface of the electrode lead plate has the one side contacting the electrode terminal and the another side contacting the PTC unit.

9. The battery pack of claim 7, further comprising two second lead plates being disposed at two opposite distal ends of the circuit module and being in direct physical contact with the surface of the bare cell and with the bottom surface of the circuit module.

10. The battery pack of claim 7, wherein the circuit module has a through hole exposing the electrode terminal.

11. The battery pack of claim 10, wherein an area of the through hole is smaller than an area of a top surface of the electrode terminal.

12. The battery pack of claim 10, wherein at least one of a width and length of the through hole is less than those of the electrode terminal.

13. The battery pack of claim 10, wherein at least a portion of the electrode lead plate is disposed under the through hole, and the electrode lead plate is welded to the electrode terminal through the through hole.

14. A battery pack, comprising:
a bare cell from which an electrode terminal protrudes;
a circuit module disposed above the electrode terminal;
a positive temperature coefficient (PTC) unit disposed between the bare cell and the circuit module, the PTC unit being electrically connected to the bare cell and the circuit module; and
an electrode lead plate having one side contacting the electrode terminal and another side contacting the PTC unit, the electrode lead plate having a top surface contacting a bottom surface of the circuit module,
wherein, when the battery pack is viewed in a direction along which the electrode terminal protrudes from the bare cell, all of the electrode terminal and the circuit module and the electrode lead plate overlap each other in at least one point, and in the at least one point, the electrode terminal is in immediate contact with the electrode lead plate and the top surface of the electrode lead plate is in contact with the bottom surface of the circuit module via an electrical insulation layer.

* * * * *